United States Patent
Hasegawa et al.

(10) Patent No.: US 9,753,664 B2
(45) Date of Patent: *Sep. 5, 2017

(54) METHOD OF DETECTING TAMPERING OF DATA IN TAPE DRIVE, AND FILE SYSTEM

(71) Applicant: International Business Machines Corporation, Armonk, NY (US)

(72) Inventors: Tohru Hasegawa, Tokyo (JP); Takamasa Hirata, Tokyo (JP); Naoki Imai, Yokohama (JP); Masanori Kamiya, Tokyo (JP); Yutaka Oishi, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/157,738

(22) Filed: May 18, 2016

(65) Prior Publication Data

US 2016/0266834 A1    Sep. 15, 2016

Related U.S. Application Data

(63) Continuation of application No. 14/347,183, filed as application No. PCT/JP2012/071352 on Aug. 23, 2012, now Pat. No. 9,406,334.

(30) Foreign Application Priority Data

Oct. 14, 2011 (JP) .................................. 2011-226709

(51) Int. Cl.
  *G11B 27/36*      (2006.01)
  *G11B 5/09*       (2006.01)
  (Continued)

(52) U.S. Cl.
  CPC .......... *G06F 3/0622* (2013.01); *G06F 3/0631* (2013.01); *G06F 3/0682* (2013.01);
  (Continued)

(58) Field of Classification Search
  CPC ....... G11B 5/86; G11B 2220/90; G11B 5/012; G11B 27/36; G11B 5/02; G11B 27/11;
  (Continued)

(56) References Cited

U.S. PATENT DOCUMENTS 7,103,741 B2    9/2006 Kato et al.
7,385,776 B2    6/2008 Itagaki et al.
(Continued)

FOREIGN PATENT DOCUMENTS

CN    101292219 A    10/2008
CN    101727503 A    6/2010
(Continued)

OTHER PUBLICATIONS

Examination Report from application No. GB1408043.6, dated Jun. 26, 2014.
(Continued)

*Primary Examiner* — Nabil Hindi
(74) *Attorney, Agent, or Firm* — Stosch Sabo

(57) ABSTRACT

A method of detecting whether data in a tape drive used in a file system is tampered is described according to one embodiment. The method includes the steps of: (a) preparing a first tape cartridge including a tape on which multiple files and archival records of index information are stored in a WORM partition, and index information is stored in the R/W partition; (b) reading and comparing the index information of the R/W partition and the last index information of the WORM partition; and (c) when these two pieces of index information do not match, determining that the index
(Continued)

information of the R/W partition is tampered in case these two pieces of index information do not match.

7 Claims, 3 Drawing Sheets

(51) Int. Cl.
*G06F 3/06* (2006.01)
*G11B 20/00* (2006.01)
*G11B 5/008* (2006.01)

(52) U.S. Cl.
CPC .... *G11B 5/00813* (2013.01); *G11B 20/00166* (2013.01); *G11B 2220/956* (2013.01)

(58) Field of Classification Search
CPC ..... G11B 5/584; G06F 21/19; G06F 12/1441; G06F 3/0601; G06F 3/0611; G06F 3/0643; G06F 3/0682
USPC ........ 360/15, 25, 31, 53, 73.04, 77.12, 72.1; 711/4, 163, 112, 111, 115
See application file for complete search history.

(56) References Cited

U.S. PATENT DOCUMENTS

| | | | |
|---|---|---|---|
| 7,694,096 B2 | 4/2010 | Haustein et al. | |
| 9,430,155 B2 * | 8/2016 | Amir | G06F 3/0611 |
| 2003/0145182 A1 | 7/2003 | Naito et al. | |
| 2004/0190179 A1 | 9/2004 | Kato et al. | |
| 2007/0094469 A1 | 4/2007 | Haustein et al. | |

FOREIGN PATENT DOCUMENTS

| | | |
|---|---|---|
| EP | 1335365 | 8/2003 |
| JP | 2004213823 | 7/2004 |
| JP | 2003228284 | 8/2008 |
| JP | 2009512925 | 3/2009 |
| WO | WO2007045630 | 4/2007 |

OTHER PUBLICATIONS

Office Action from application No. JP2013-538469, dated Jun. 10, 2014.
Richmond, M., "LTFS consistency and Index snapshots," posted on Jul. 12, 2011, p. 1-4.
"Linear Tape File System (LTFS) Format Specification," Aug. 17, 2011. LTFS Format Version 2.0.1, pp. 1-20.
"LTO Ultrium WORM Magnetic Tape Technology, SEC 17a-4(f) Compliance Assessment," Cohasset Associates, Inc., Oct. 2005, pp. 1-18.
International Preliminary Report from application No. PCT/JP2012/071352, dated Apr. 24, 2014 (Non-Translated Version).
International Preliminary Report from application No. PCT/JP2012/071352, dated Apr. 24, 2014 (Translated Version).
Hasegawa, T., et al., "Method of Detecting Tampering of Data in Tape Drive, and File System", U.S. Appl. No. 14/347,183, filed Mar. 25, 2014.

* cited by examiner

METHOD OF DETECTING TAMPERING OF DATA IN TAPE DRIVE, AND FILE SYSTEM

BACKGROUND

The present invention relates to a tape drive, and more specifically to a method of detecting whether data in a tape drive used in a file system is tampered.

The tape drive is usable on a file system as well as an HDD. As the tape drive usable on the file system, for example, there is an LTO-5 tape drive. In this LTO-5 tape drive, a tape is divided into two partitions. Each partition can be handled as if it were one tape to selectively write data, respectively.

In the meantime, access to data for illicit purposes and data tampering have recently increased. Therefore, it is important to prevent the tampering of data even in a tape drive. When this prevention of data tampering is performed in the tape drive, it is considered, for example, that a WORM (Write Once Read Many) partition is set in the tape drive so that data once written cannot be rewritten.

For example, Japanese Translation of PCT Application No. 2009-512925 discloses that partitions with no protected state (R/W) or partitions with a protected state such as WORM are set on a storage medium of a storage device including a tape drive.

CITATION LIST

Patent Literature

[Patent Literature 1]
Japanese Translation of PCT Application No. 2009-512925

BRIEF SUMMARY

However, since file index information cannot be rewritten in methods of setting partitions with a protected state such as WORM including that of Patent Literature 1, information must be added at every time of writing. There is a problem that index information cannot be updated when the capacity of a partition for storing index information is full. Even when there is no problem with the capacity, since the latest index information is stored at the end of the partition on a tape, there is a problem that the time required to read the index information increases.

Therefore, it is an object of the present invention to provide a method of detecting whether data in a tape drive used in a file system is tampered while solving or reducing these problems of conventional techniques.

The present invention provides a method of detecting whether data in a tape drive used in a file system is tampered. The method includes the steps of: (a) preparing a first tape cartridge including a tape having at least two or more partitions, where at least one partition is a WORM partition, at least any other one partition is an R/W partition, multiple files and archival records of index information are stored in the WORM partition, and index information is stored in the R/W partition; (b) reading the index information of the R/W partition and the last index information of the WORM partition from the tape drive in which the first tape cartridge is inserted, and comparing both pieces of index information; and (c) when the index information of the R/W partition and the last index information of the WORM partition do not match, determining that the index information of the R/W partition is tampered.

According to the present invention, the index information of the R/W partition can be rewritten arbitrarily, and this can avoid information becoming bloated due to additions to the WORM partition. Further, high-speed access can be maintained, as in the case of using a file system with a conventional R/W tape, by storing only the latest index information in the R/W partition at all times. Furthermore, the tampering of index information can be detected without involving the file system by comparing the index information last stored in the WORM partition with the index information stored in the R/W partition.

In one aspect of the present invention, the method further includes a step of determining, based on the archival records of index information of the WORM partition, whether a file in the WORM partition is updated or deleted.

According to the aspect of the present invention, even when the file is updated or deleted using a file system, the file before updated or deleted can be restored by using a technique for tracing the archival records of the index information.

In another aspect of the present invention, the method further includes the steps of: (d) preparing a second tape cartridge including a tape having at least two or more partitions, where at least one partition is a WORM partition, at least any other one partition is an R/W partition, index information is stored in the WORM partition, and a file is stored in the R/W partition; and (e) reading the index information of the WORM partition from the tape drive in which the second tape cartridge is inserted, and determining, based on the index information, whether the file in the R/W partition is updated or deleted.

According to the aspect of the present invention, even when the file stored in the R/W partition is deleted or updated (tampered), the deletion or update can be detected from the index information of the WORM partition.

In still another aspect of the present invention, the R/W partition is the first partition in a longitudinal direction of the tape.

According to the aspect of the present invention, it is possible to provide high-speed access to the index information or the file stored in the R/W partition.

In yet another aspect of the present invention, there is provided a file system including a computer, a tape drive communicable with the computer, and a first tape cartridge inserted in the tape drive. The first tape cartridge includes a tape having at least two or more partitions, where at least one partition is a WORM partition, at least any other one partition is an R/W partition, multiple files and archival records of index information are stored in the WORM partition, and index information is stored in the R/W partition. The computer reads the index information of the R/W partition and the last index information of the WORM partition from the tape drive in which the first tape cartridge is inserted, and when both pieces of index information do not match, determines that the index information of the R/W partition is tampered.

According to the aspect of the present invention, the index information of the R/W partition can be rewritten arbitrarily in the file system including the tape drive, and this can avoid information becoming bloated due to adding of index information to the WORM partition. Further, high-speed access can be maintained, as in the case of using a file system with a conventional R/W tape, by storing only the latest index information in the R/W partition at all times. Furthermore, the tampering of index information can be detected without involving the file system by comparing the index information last stored in the WORM partition with the index information stored in the R/W partition.

BRIEF DESCRIPTION OF THE DRAWINGS

Brief Description of the Several Views of the Drawings

Figure 1:
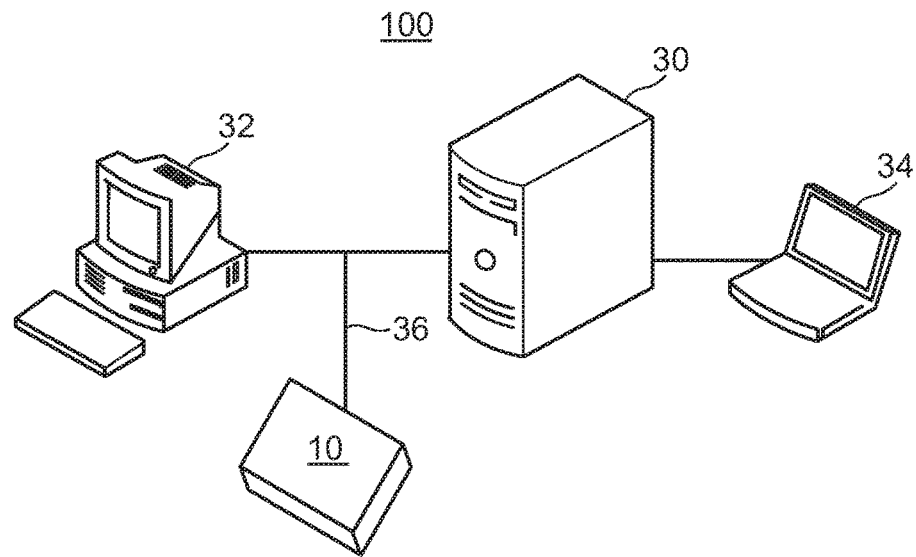

FIG. 1 is a diagram showing a configuration example of a file system of the present invention.

Figure 2:
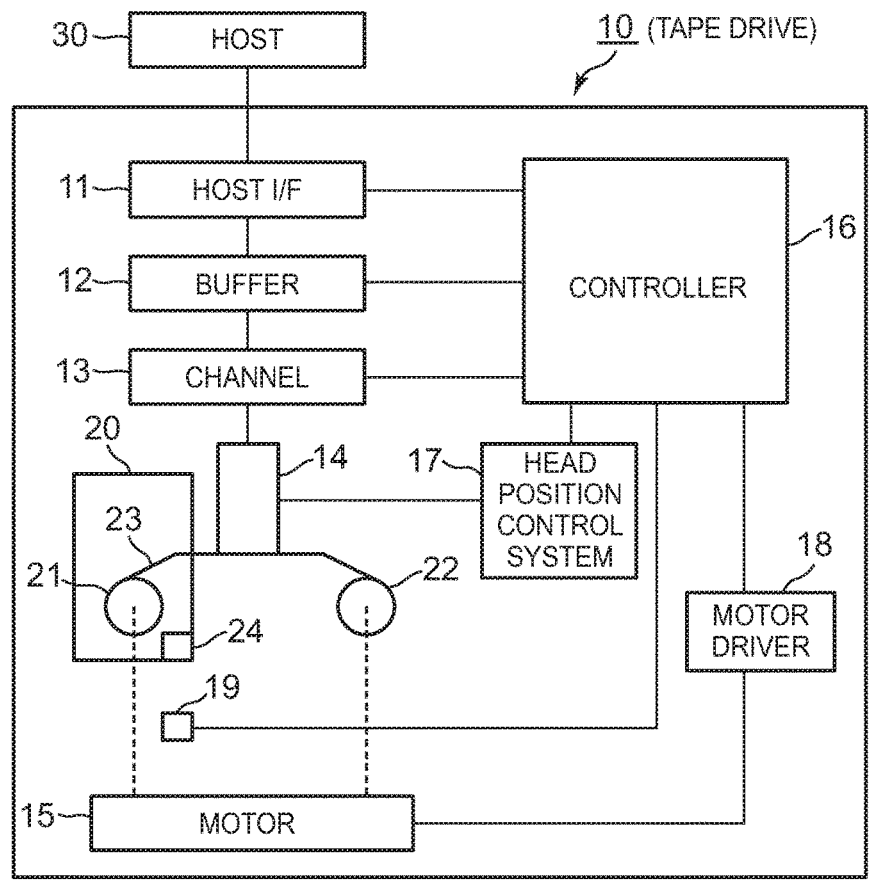

FIG. 2 is a diagram showing a configuration example of a tape drive of the present invention.

Figure 3:
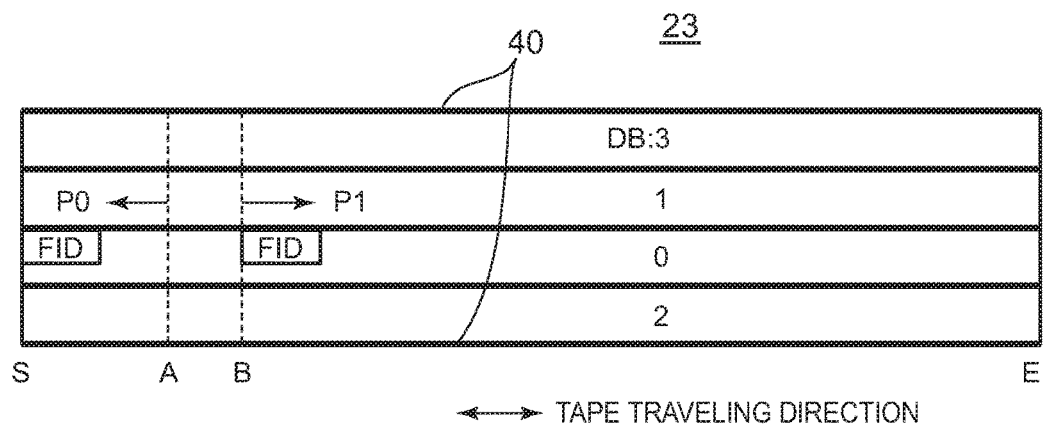

FIG. 3 is a diagram showing an example of the structure of a tape of the present invention.

Figure 4:
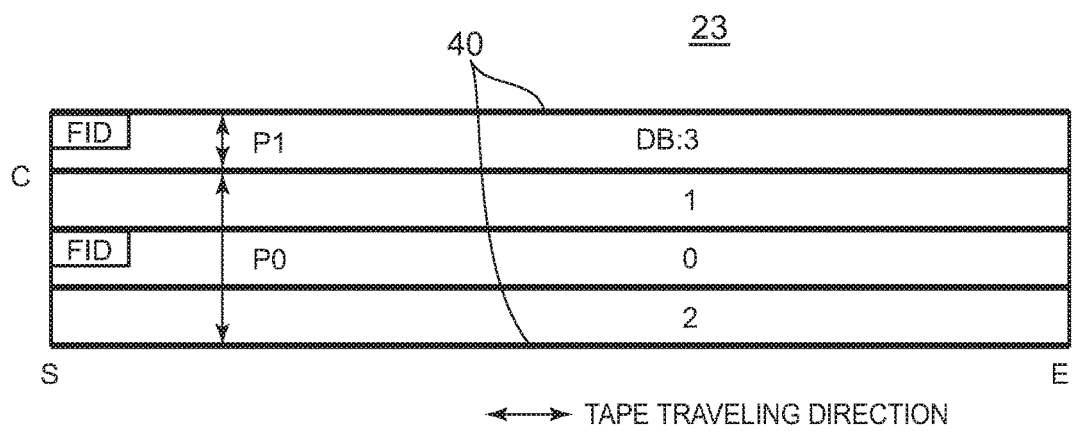

FIG. 4 is a diagram showing another example of the structure of the tape of the present invention.

Figure 5:
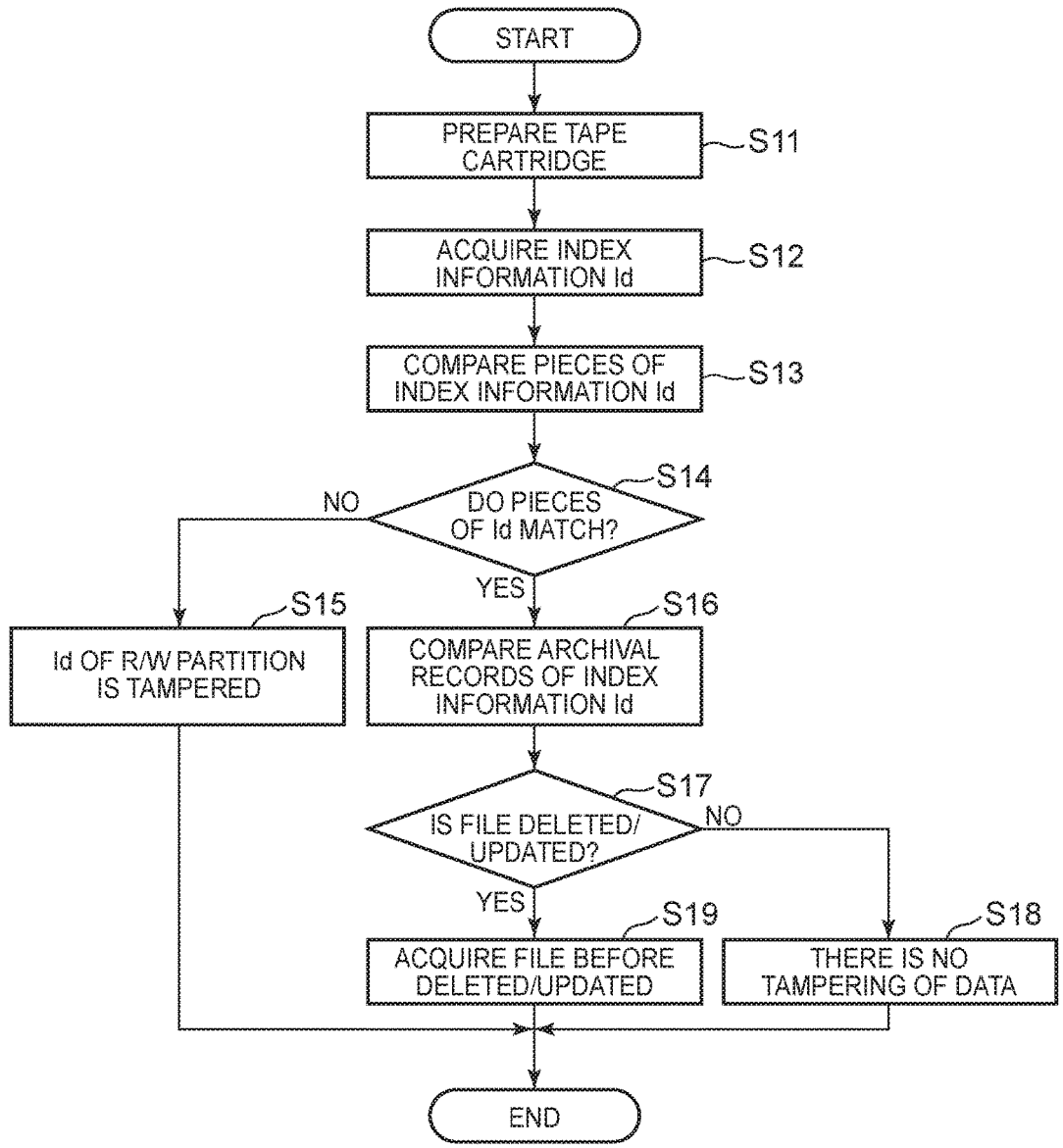

FIG. 5 is a chart showing a flow of detecting the tampering of data in the tape drive of the present invention.

DETAILED DESCRIPTION

An embodiment of the present invention will be described with reference to the accompanying drawings. FIG. 1 is a diagram showing a configuration example of a file system of the present invention. A file system 100 is configured to include a tape drive 10, a host (server) 30, and PCs (terminals) 32, 34, which are communicable with one another through a network 36. The tape drive 10 and the host (server) 30 are each illustrated as one component in FIG. 1, but this is just an example. It goes without saying that two or more tape drives 10 and hosts (servers) 30 can be included.

For example, the file system 100 can be an LTFS (Linear Tape File System). Like an HDD, a USB memory, or any other removable recording medium such as a CD-R, the LTFS provides a mechanism that enables direct access to a file stored in a tape cartridge when the tape cartridge is inserted into the tape drive. In order to build a file system on a tape drive, the tape drive needs to have a partition feature. In the latest LTO-5 standard, a tape is divided into two partitions.

FIG. 2 is a diagram showing a configuration example of the tape drive of the present invention. The tape drive 10 includes a host interface (hereinafter called "host I/F") 11, a buffer 12, a channel 13, a head 14, and a motor 15. The tape drive 10 also includes a controller 16, a head position control system 17, and a motor driver 18. Since a tape cartridge 20 is loadable when the tape cartridge 20 is inserted into the tape drive 10, the tape cartridge 20 is further shown here. This tape cartridge 20 includes a tape 23 wound on reels 21 and 22. The tape 23 moves in a longitudinal direction with the rotation of the reels 21 and 22 from the reel 21 to the reel 22 or from the reel 22 to the reel 21. A magnetic tape is exemplified as the tape 23, but the tape 23 may be any tape medium other than the magnetic tape.

The tape cartridge 20 also includes a cartridge memory (CM) 24. This CM 24 records, for example, information about how data was written on the tape 23. Then, for example, an index of data written on the tape 23 in a noncontact mode using an RF interface or the usage of the tape 23 is checked to enable high-speed access to the data. In FIG. 2, an interface like this RF interface for performing access to the CM 24 is shown as a cartridge memory interface (hereinafter, referred to as "CM I/F") 19.

Here, the host I/F 11 performs communication with the host (server) 30 or the other PC 32. For example, the host I/F 11 receives, from the OS of the host 30, a command to instruct writing of data to the tape 23, a command to move the tape 23 to a target position, and a command to instruct reading of data from the tape 23. In the example of the LTFS mentioned above, data within the tape drive can be referred directly from a desktop OS or the like, and a file can be executed by the double click or copied by the drag-and-drop action like a case of handling a file within an HD.

The buffer 12 is a memory for accumulating data to be written to the tape 23 and data read from the tape 23. For example, the buffer 12 is a DRAM. The buffer 12 is composed of multiple buffer segments, and each buffer segment stores a data set as a unit of read/write from/to the tape 23.

The channel 13 is a communication channel used to send the head 14 data to be written to the tape 23 and receive, from the head 14, data read from the tape 23. The head 14 writes information to the tape 23 and reads information from the tape 23 when the tape 23 moves in the longitudinal direction. The motor 15 drives the reels 21 and 22 to rotate. Note that although the motor 15 is indicated by one rectangle in FIG. 2, it is preferred to provide, as the motor 15, a total of two motors, one for each of the reels 21 and 22.

The controller 16 controls the entire tape drive 10. For example, the controller 16 controls writing to the tape 23 and reading from the tape 23 according to the commands accepted at the host I/F 11. The controller 16 also controls the head position control system 17 and the motor driver 18. The head position control system 17 is a system for keeping track of a desired wrap. Here, the wrap means a group of multiple tracks on the tape 23. When it is necessary to switch from one wrap to another, the head 14 also needs to be electrically switched. Such switching is controlled by this head position control system 17.

The motor driver 18 drives the motor 15. As mentioned above, if two motors 15 are used, two motor drivers 18 will also be provided. The CM I/F 19 is, for example, implemented by an RF reader/writer to write information to the CM 24 and read information from the CM 24.

FIG. 3 and FIG. 4 are diagrams showing examples of the structure of the tape 23 in the tape cartridge 20 of the present invention. FIG. 3 shows an example of a tape 23 supported by the IBM TS1140 Enterprise Tape Drive. FIG. 4 shows an example of an LTO-5 compliant tape 23. FIG. 3 is an example where the tape is divided backward and forward into partitions P0 and P1 at positions A and B in a tape traveling (longitudinal) direction. The positions A and B can be basically set to any positions. FIG. 4 is an example where the tape is divided upward and downward into partitions P0 and P1 at position C in a wide (short) direction of the tape. Note that although the number of partitions is two and the tape is divided into two partitions P0 and P1 in both figures, it goes without saying that the number of partitions can be changed to any number of three or more according to each specification such as the LTO standard.

In both FIG. 3 and FIG. 4, the recording surface is so formed on a tape of 12. 65 mm wide that five servo bands 40 are arranged to sandwich four data bands DB 0 to 3. For example, in the LTO-5 tape drive, one data band has 320 data tracks (not shown), and the tape has 1280 data tracks in total. A servo pattern for guiding the head 14 (making the head 14 to track) accurately is prerecorded in each of the servo bands 40. The tape drive 10 locates the head 14 accurately while reading the servo pattern in two servo bands 40 that sandwich each of the data bands DB 0 to 3 to write or read data.

In FIG. 3 and FIG. 4, for example, the same information as information written in the CM 24 (FIG. 2) of the tape cartridge 20, i.e., information as to how data was written on the tape 23 is recorded in each area indicated as FID. This is to enable the reading of data from the tape cartridge (tape) even if it is difficult to read the data from the CM 24.

In the present invention, R/W or WORM is set for each partition of the tape 23, and simultaneously, information to be written to the R/W partition is distinguished from information to be written to the WORM partition to detect the presence or absence of data tampering in a manner to be described later. Here, the R/W partition means a rewritable partition, and the WORM partition means such a partition that information once written cannot be rewritten (updated or deleted).

Specifically, for example, it is assumed in FIG. 3 that partition P0 is the R/W partition and partition P1 is the WORM partition. Index information is stored in the R/W partition, and files and archival records of index information are stored in the WORM partition. According to this structure, the index information in the R/W partition can be rewritten arbitrarily, and this can avoid information becoming bloated due to additions to the WORM partition. Further, high-speed access can be maintained, as in the case of using a file system with a conventional R/W tape, by storing only the latest index information at all times in the R/W partition located at the front side of the tape 23.

The structure can also be such that index information is stored in the WORM partition and files are stored in the R/W partition. According to this aspect of the present invention, even when a file stored in the R/W partition is deleted or updated (tampered), the archival records of the index information of the WORM partition can be checked to detect the deletion or update Information about which partition of the tape 23 is set as the WORM partition is stored in the FID or the servo pattern of the servo bands 40 of the tape 23 at the time of shipment of the tape 23. Alternatively, the information may be stored in the CM 24 of the tape cartridge 20 (FIG. 2). When the information is stored directly on the tape 23, the information can be read from the tape cartridge 20 even if it is difficult to read the information from the CM 24.

As setting information on the WORM partition, which is stored at the time of tape shipment, for example, there are the following two forms: The first form is such a form to specify a WORM partition number directly. In other words, the tape drive is configured to handle partitions corresponding to a specific partition number group as WORM partitions consistently at the time of tape shipment.

The second form is such a form to define the WORM partition according to the number of partitions. For example, when the number of partitions is one, the partition is handled as the WORM partition. When the number of partitions is two, the first partition is handled as the R/W partition and the second partition is handled as the WORM partition. Thus, the WORM partition is changed according to the number of partitions existing on the tape, i.e., when the number of partitions is three, and so on. This form is effective, for example, when it is desired to set at least one partition on the tape as the WORM partition but desired to use the first one (e.g., P0 in FIG. 3) of partitions whose average seek time is shortest when multiple partitions exist.

In order to allow a user to set a partition used as the WORM partition at the discretion of the user, the structure may also be such that only information indicating that the tape has the WORM partition feature is recorded in the servo pattern so that the user can set, at the initialization of the tape, information indicating which partition is handled as WORM in an area of the CM, where no data is rewritten after the initialization. In this case, a mechanism capable of detecting replacement when the CM is replaced, e.g., such a mechanism to leave the serial number of the CM in the servo pattern is required.

Referring next to FIG. 5, a flow of detecting whether data in the tape drive used in the file system is tampered. For example, the flow in FIG. 5 is performed by software executed on the server 30 or the PC 32 or the like in the configuration of FIG. 1.

In step S11, tape cartridges are prepared. The prepared tape cartridges are two first and second tape cartridges. Both cartridges have at least two or more partitions, respectively. Among the partitions, at least one partition is the WORM partition and at least any other one partition is the R/W partition. The first tape cartridge includes a tape on which multiple files and archival records of index information are stored in the WORM partition and index information is stored in the R/W partition. The second tape cartridge includes a tape on which index information is stored in the WORM partition and files are stored in the R/W partition. The examples of the structures of the tapes are as already described with reference to FIG. 3 and FIG. 4.

In step S12, pieces of index information Id are acquired from a tape cartridge. Specifically, index information Id1 of the R/W partition and the last index information Id2 of the WORM partition are read from the tape drive in which the first tape cartridge is inserted. Alternatively, index information Id3 of the WORM partition is read from the tape drive in which the second tape cartridge is inserted.

In step S13, index information is compared. Specifically, the index information Id1 of the R/W partition is compared with the last index information Id2 of the WORM partition in the first tape cartridge. In step S14, it is determined whether the pieces of index information Id1 and Id2 match. When this determination is No, it is determined in step S15 that the index information of the R/W partition of the first tape cartridge is tampered.

When the determination in step S13 is Yes, archival records of index information are compared in step S16. Specifically, the archival records of the index information Id2 of the WORM partition in the first tape cartridge are compared. According to the comparison result in step S16, it is determined in step S17 whether a file in the WORM partition of the first tape cartridge is updated or deleted. Specifically, from the comparison result of the archival records of the index information Id2, it is detected that the last update time and date of the file is changed or the file corresponding to the index information is missing to determine whether the file is updated or deleted.

When the determination in step S17 is No, it is determined in step S18 that there is no tampering of data in the WORM partition of the first tape cartridge. When the determination in step S17 is Yes, the index information is rolled back as needed to update the WORM partition or acquire (restore) the file before deleted.

In step S16, the archival records of the index information Id3 in the WORM partition of the second tape cartridge can also be compared. In this case, according to the comparison result in step S16, it is determined in step S17 whether a file in the R/W partition of the second tape cartridge is updated or deleted. The specific determination is the same as that in the case of the file in the WORM partition of the first tape cartridge mentioned above. When the determination in step S17 is No, it is determined in step S18 that there is no tampering of data in the R/W partition of the second tape cartridge. When the determination in step S17 is Yes, the index information is rolled back as needed to update the R/W partition or acquire (restore) the file before deleted.

The embodiment of the present invention has been described with reference to the drawings. However, the present invention should not be limited to the embodiment. For example, in the aforementioned embodiment, the description is made by mainly taking, as an example, a case where the number of LTO-5 compliant partitions is two, but the present invention is not limited thereto. The present invention is also applicable to a case of having two or more multiple partitions. Further, the present invention can be carried out in modes to which various improvements, alterations, and modifications are added on the basis of the knowledge of those skilled in the art without departing from the spirit of the present invention.

DESCRIPTION OF REFERENCE NUMERALS 10 tape drive
11 host I/F
12 buffer
13 channel
14 head
15 motor
16 controller
17 head position control system
18 motor driver
19 cartridge memory I/F
20 tape cartridge
21, 22 reel
23 tape
24 cartridge memory (CM)
30 server (host)
32, 34 PC
36 network
40 servo band
100 file system

The invention claimed is:

1. A method of detecting whether data in a tape drive used in a file system is tampered, the method comprising:
preparing a first tape cartridge including a tape having at least two or more partitions, where at least one partition is a Write Once Read Many (WORM) partition, at least any other one partition is an R/W partition, index information is stored in the WORM partition, and a file is stored in the R/W partition, wherein information indicating which partitions of the at least two or more partitions are the WORM partition and the R/W partition is recorded in an FID or a servo band of the tape, or stored in a memory of the first tape cartridge;
reading the index information of the WORM partition from the tape drive in which the first tape cartridge is inserted, and determining, based on the index information, at least one of whether the file in the R/W partition is updated or deleted.

2. The method according to claim 1, wherein the R/W partition is a first partition in a longitudinal direction of the tape.

3. A computer program product for detecting whether data in a tape drive used in a file system is tampered, the computer program product comprising a computer readable non-transitory storage medium having program instructions embodied therewith, the program instructions executable by a processor to cause the processor to perform a method comprising:
preparing a first tape cartridge including a tape having at least two or more partitions, where at least one partition is a Write Once Read Many (WORM) partition, at least any other one partition is an R/W partition, a plurality of files and archival records of index information are stored in the WORM partition, and index information is stored in the R/W partition;
reading the index information of the R/W partition and last index information of the WORM partition from the tape drive in which the first tape cartridge is inserted, and comparing both pieces of index information; and
determining that the index information of the R/W partition is tampered when the index information of the R/W partition and the last index information of the WORM partition do not match.

4. The computer program product of claim 3, wherein the program instructions are further configured to cause the processor to perform a method further comprising:
determining whether a file in the WORM partition is updated or deleted, based on the archival records of index information of the WORM partition.

5. The computer program product of claim 3, wherein the program instructions are further configured to cause the processor to perform a method further comprising:
preparing a second tape cartridge including a tape having at least two or more partitions, where at least one partition on the tape of the second tape cartridge is a WORM partition, at least any other one partition on the tape of the second tape cartridge is an R/W partition, index information is stored in the WORM partition, and a file is stored in the R/W partition; and
reading the index information of the WORM partition from the tape drive in which the second tape cartridge is inserted, and determining, based on the index information, at least one of whether the file in the R/W partition is updated or deleted.

6. The computer program product of claim 5, wherein information indicating which partitions of the at least two or more partitions are the WORM partition and the R/W partition is recorded in an FID or a servo band of the tape, or stored in a memory of the second tape cartridge.

7. The computer program product of claim 3, wherein the R/W partition is a first partition in a longitudinal direction of the tape.

* * * * *